G. H. WRIGHT.
PLANTER.
APPLICATION FILED APR. 7, 1920.
1,385,937.
Patented July 26, 1921.
2 SHEETS—SHEET 2.
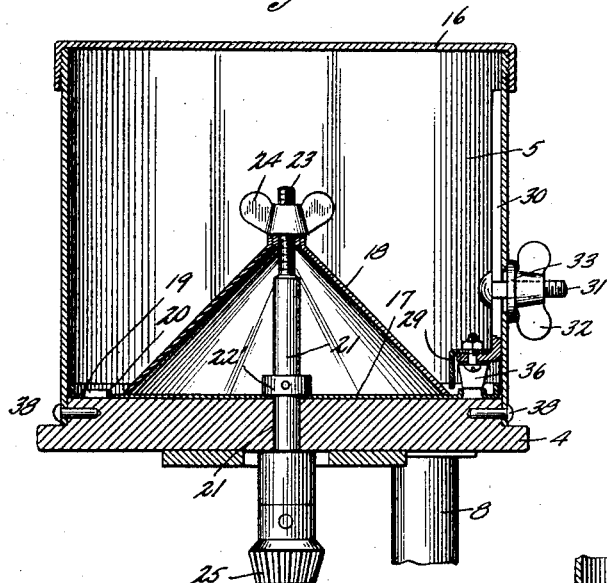
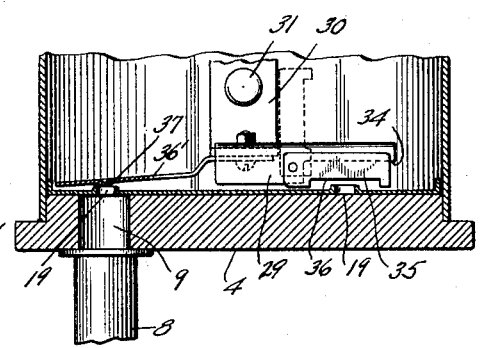
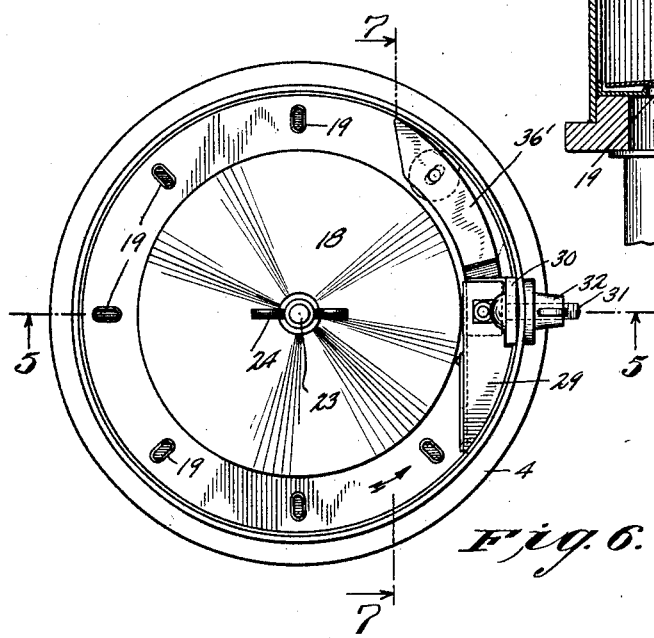
WITNESSES
INVENTOR
G. H. WRIGHT,
BY
ATTORNEYS

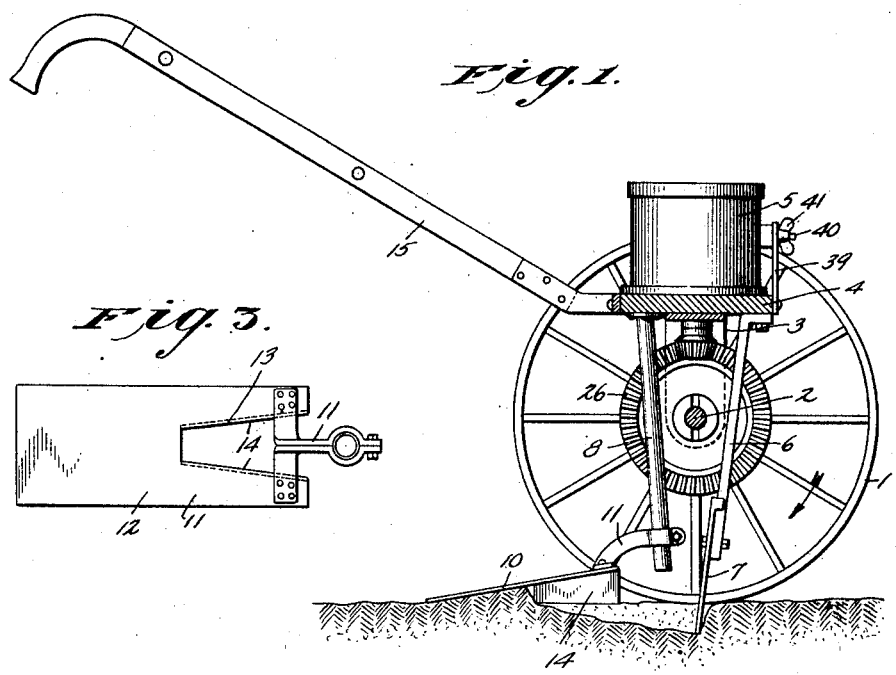
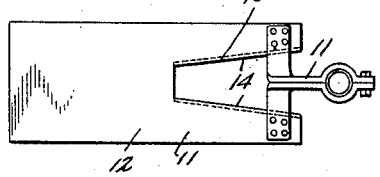
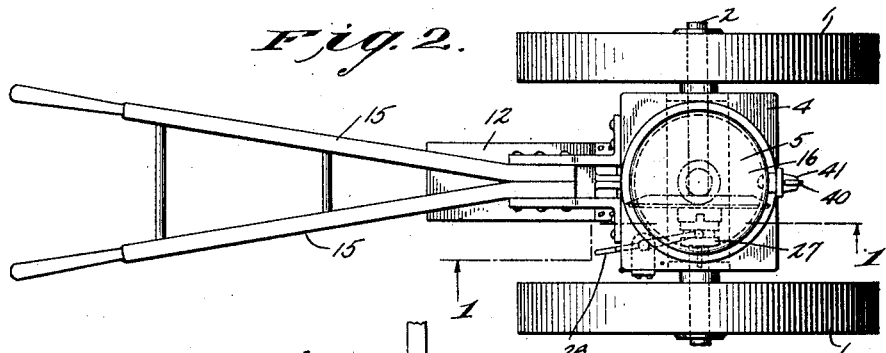
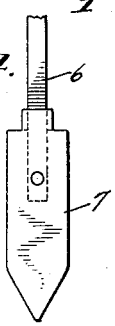

UNITED STATES PATENT OFFICE.

GEORGE H. WRIGHT, OF SPOKANE, WASHINGTON.

PLANTER.

1,385,937.   Specification of Letters Patent.   Patented July 26, 1921.

Application filed April 7, 1920. Serial No. 371,968.

*To all whom it may concern:*

Be it known that I, GEORGE H. WRIGHT, a citizen of the United States, and a resident of Spokane, in the county of Spokane and State of Washington, have invented a new and Improved Planter, of which the following is a full, clear, and exact description.

This invention relates to improvements in planters, an object of the invention being to provide improved means for controlling the dropping of the seed, which means is adjustable so as to provide for different sizes of seed and is automatic and driven by the traction of the planter over the ground.

A further object is to provide improved means for opening a trench and covering the same after the seed has been dropped therein.

A further object is to provide a planter which is especially designed for garden use and may be either pushed or pulled over the ground and which can be manufactured and sold at a reasonably low price.

With these and other objects in view the invention consists in certain novel features of construction, and combinations and arrangements of parts, as will be more fully hereinafter described and pointed out in the claims.

In the accompanying drawings—

Figure 1 is a view in longitudinal section on the line 1—1 of Fig. 2, showing my improved planter in use.

Fig. 2 is a top plan view of the device shown in Fig. 1.

Fig. 3 is an enlarged plan view of my improved seed coverer.

Fig. 4 is a view in elevation of the trench forming plow.

Fig. 5 is an enlarged view in vertical section on the line 5—5 of Fig. 6.

Fig. 6 is a top plan view of the seed box with the cover removed.

Fig. 7 is a view in section on the staggered line 7—7 of Fig. 6.

1, 1 represent a pair of traction wheels supporting an axle 2 and turning the latter. A frame 3 is mounted on the axle 2 and supports a platform 4 on which a seed box 5 is mounted. A downwardly and rearwardly projecting bracket 6 is secured to the platform 4 and is provided at its lower end with a removable trowel or plow 7 which is adapted to open a trench in the ground for the reception of the seed.

A seed guiding tube 8 is fixed to the platform 4 and at its upper end registers with the seed outlet opening 9 in said platform. The lower end of this tube 8 is spaced above the ground and located in rear of the plow 7 so as to drop the seed into the trench.

10 represents my improved covering device which is connected by a clamping bracket 11 with the lower end of the tube 8. This covering device constitutes a top plate 12 which is slightly inclined and at its forward end is made with an approximately V-shaped recess 13 having vertical walls 14 which operate to scrape the dirt from the sides of the trench toward the center thereof, while the rear end of the plate 12 operates to spread the soil evenly and cover the seed. Handles 15 are fixed to the platform 4 or to any other suitable portion of the planter and they may be operated to force or guide the planter over the ground.

It is, of course, obvious that the planter might be operated either by pulling or pushing the same and may be either operated by man power or by any suitable draft animal or device.

The seed box 5 is of general cylindrical form and provided with a removable top or cover 16. A seed feeding plate or disk 17 is located on the platform 4 which constitutes the bottom of the seed box and a conical deflector 18 is mounted above the plate 17 and operates to direct the seed in the box into any of a circular series of seed receiving pockets 19 adjacent the outer edge of the disk 17. These pockets 19 are open at the top and bottom and have upwardly projecting walls 20 spaced slightly above the upper surface of the disk 17 so as to effectually carry one or more seeds therein. Separate seed plates are provided for different seed with shape of pockets according to shape of seed.

A vertical shaft 21 has rotary mounting in an opening 22 in platform 4 and is provided with a collar 22' bearing against the disk 17. The upper screw threaded end 23 of the shaft 21 extends through the apex of the conical deflector 18 and a set nut 24 is screwed downwardly upon the threaded end 23 exerting the necessary frictional contact of the deflector 18 with the disk 17 to compel said disk and deflector to turn with the shaft 21.

A beveled pinion 25 is provided on the lower end of the shaft 21 and is driven by a beveled gear 26 loose on the axle 2. A clutch 27 is provided on the axle 2 and is operated by means of a lever 28 so as to move the clutch into locked engagement with the gear 26 or to release the gear from said locked engagement to allow the traction wheels to turn freely when moving the device from place to place without operating the seed dropping mechanism.

In the seed box 5 I provide a seed receiving housing 29 which is supported by a bracket 30, the latter adjustable vertically and secured at any desired adjustment by means of a bolt 31 and nut 32, the bolt being projected through a slot 33 in the wall of the seed box. This housing 29 is of angular shape, as shown clearly in Fig. 5, and its depending wall is made with a recess 34 under which the seeds are carried in the pockets 19.

A pivotally supported gate 35 is connected to the side of the housing 29 and is likewise made in its lower edge with a recess 36. This gate is in lowered position when the device is feeding small seed and is elevated or raised to the dotted line position shown in Fig. 7 when the device is using larger seed such as peas, etc. This gate 35 and the side wall of the housing 29 operate to hold back the excess of seed and allow a substantially small quantity of seed to pass into the housing and through the housing to dropping position over the opening 9. A spring tongue 36' is connected to the housing and adjacent its free end is made with a depending projection 37 which fits over the pockets 19 and operates to eject any seed which may stick therein and also prevents possibility of other seed falling through the pocket when the latter is in discharging position.

In Fig. 5 I illustrate the wall of the seed box 5 as secured to the platform 4 by means of tacks, or nails 38, while in Fig. 1 I illustrate a different form of attachment which consists in providing an upright bracket 39 on the platform 4 and secure the seed box by means of a bolt 40 and nut 41. It is obvious that the particular manner of connecting the seed box with the platform can be varied to suit the trade.

The operation is as follows: As the wheels 1 go over the ground, they revolve the axle 2 and when the gear 26 is locked to the axle 2 by means of the clutch 27, motion will be transmitted to the shaft 21 through the medium of the pinion 25. The shaft 21 will cause the disk 17 and conical deflector 18 to revolve and the pockets 19 in the disk 17 will carry the seed through the housing 29 and drop the seed through the opening 9. The seed will then be guided by the tube 8 into the trench made by the plow 7 and the covering device 10 will close the trench to cover the seed as it is planted.

Various slight changes might be made in the general form and arrangement of parts described without departing from the invention, and hence I do not limit myself to the precise details set forth, but consider myself at liberty to make such changes and alterations as fairly fall within the spirit and scope of the appended claims.

I claim:

1. A planter, comprising a seed box having an outlet opening in its bottom, a disk on the bottom of the seed box having adjacent its edge a circular series of seed openings or pockets, said pockets having walls projecting slightly above the surface of the disk, a conical deflector secured centrally on the disk and directing the seed into the pockets, means for controlling the discharge of seed from the pockets through said outlet, said means comprising a housing having an opening for the passage of the pockets, a pivoted gate controlling said opening, and a spring tongue adapted to eject seeds through the bottom of the pockets.

2. A seed dispensing mechanism for planters comprising a seed box, a rotary disk in the seed box having a circular series of seed pockets extending therethrough, said pockets having raised walls, means directing the seeds into the pockets, a bracket secured to the inner wall of the seed box, a housing supported by the bracket and spaced slightly above the face of the disk, said housing having an opening therein permitting the passage of the pockets therethrough, a gate controlling the opening, and a spring tongue secured to the housing and adapted to eject seeds from the pockets, said tongue formed with its intermediate portion bent downwardly to engage the seeds in the pockets.

3. A seed dispensing mechanism for planters comprising a rotary disk having a circular series of pockets extending therethrough with raised walls, means for directing the seeds into the pockets, means controlling and compelling the ejection of seeds from the pockets, and means for turning the disk, said last mentioned means comprising a shaft projecting upwardly through the center of the disk and fixed to turn therewith, a pinion fixed to the lower end of the shaft, and a gear wheel fixed to the axle of the planter and meshing with the pinion.

GEORGE H. WRIGHT.